United States Patent [19]

Murai

[11] Patent Number: 5,297,321
[45] Date of Patent: Mar. 29, 1994

[54] FASTENING DEVICE

[75] Inventor: Ryukichi Murai, Toyama, Japan

[73] Assignee: Yoshida Kogyo K.K., Tokyo, Japan

[21] Appl. No.: 84,127

[22] Filed: Jul. 1, 1993

[30] Foreign Application Priority Data

Jul. 8, 1992 [JP] Japan .................. 4-053799

[51] Int. Cl.$^5$ ............................. A44B 13/00
[52] U.S. Cl. ................... 24/600.4; 24/598.7; 24/601.6; 294/82.23
[58] Field of Search ................ 24/600.4, 600.3, 600.2, 24/600.1, 598.1, 598.7, 600.5, 600.6, 601.6, 601.5, 598.8, 598.9; 294/82.21, 82.22, 82.23

[56] References Cited

U.S. PATENT DOCUMENTS

| | | | |
|---|---|---|---|
| 643,924 | 2/1900 | Vannote | 24/600.4 |
| 1,522,979 | 1/1925 | Ratigan | 294/82.23 |
| 1,523,765 | 1/1925 | Gilchrist | 294/82.23 |
| 1,715,192 | 5/1929 | Fortin | 294/82.22 |
| 4,865,374 | 9/1989 | Gonda | 294/82.23 |

FOREIGN PATENT DOCUMENTS 60-15938 5/1985 Japan .

*Primary Examiner*—Victor N. Sakran
*Attorney, Agent, or Firm*—Hill, Steadman & Simpson

[57] ABSTRACT

A fastening device for connecting a garment article such as a shoulder bag which comprises only two separate component parts; viz., a main body and a retainer member. The main body includes a socket member, a belt connector and a "J"-shaped hook member, the socket member having lock windows, and a pair of guide slots with tapered portions extending beyond the lock windows toward one end of the socket, and the hook member having an arcuate bay for anchoring a link of a bag. The retainer member includes a plug portion with a pair of resilient arms and a downwardly projecting tongue dimensioned to cover the arcuate bay when the plug portion is held in locked relation with respect to the socket.

4 Claims, 4 Drawing Sheets

FASTENING DEVICE

BACKGROUND OF THE INVENTION

1. Field of the Invention

This invention relates to a fastening device for fastening or connecting a strap, belt or similar web-like material to a bag or other garment articles.

2. Prior Art

There have been proposed numerous fastening devices having connecting means for connecting a loose end of a strap secured to for instance a shoulder bag or the like and a generally "J"-shaped hook means for releasably receiving a link end of the bag.

A typical example of such prior art device is disclosed for example in Japanese Utility Model Publication No. 60-15938, the disclosed device comprising a base having a pivotable ring member on its top and a "J"-like hook member with one end secured to its bottom and with the opposite end spaced from the base across a gap forming a mouth of the hook member. Extending laterally through the base is a bore accommodating a compression spring and receiving movably therein a retainer pin with a knob to open and close the mouth of the hook. The pin is pulled in one direction against the tension of the compression spring to open the mouth so as to allow entry of a bag link into the hook member. Such prior art device having a total of five different component parts is less expedient in assembly and has a drawback in that when connecting the bag link, the user is required to hold the base with one hand while pulling the retainer pin with the other hand against the tension of the spring, thus rendering the operation of the fastening device rather tedious, if not difficult.

SUMMARY OF THE INVENTION

With the foregoing drawbacks of the prior art in view, the present invention seeks to provide an improved fastening device which consists substantially of only two separate component parts, contributing to low-cost production and ease of assembly and which can be expeditiously handled with one hand to connect or disconnect a link on a garment article to which the device is applied.

The above and other objects, features and advantages of the invention will appear clear from the following detailed description taken in conjunction with the accompanying drawings which illustrate by way of example a preferred embodiment.

According to the invention, there is provided a fastening device which comprises a main body and a retainer member engageable therewith, the main body including, integral therewith, a cylindrical socket member, a belt connector overlying the socket member and a hook member underlying the socket member, and the retainer member including, integral therewith, a plate portion and a plug portion; the socket member being provided in its inner peripheral wall with a pair of guide slots disposed in diammetrically opposed relation to each other and tapering towards one end of the socket member and further with lock windows communicating with the guide slots; the hook member generally in the form of a "J"-like configuration having an arcuate bay; the plate portion having a downwardly projecting tongue dimensioned to cover the bay; and the plug member being movable in and relative to the socket member and provided with a pair of spaced parallel resilient arms each having arrow-like heads respectively engageable with the guide slots and lockable in the lock windows.

DETAILED DESCRIPTION OF THE INVENTION

Figure 1:
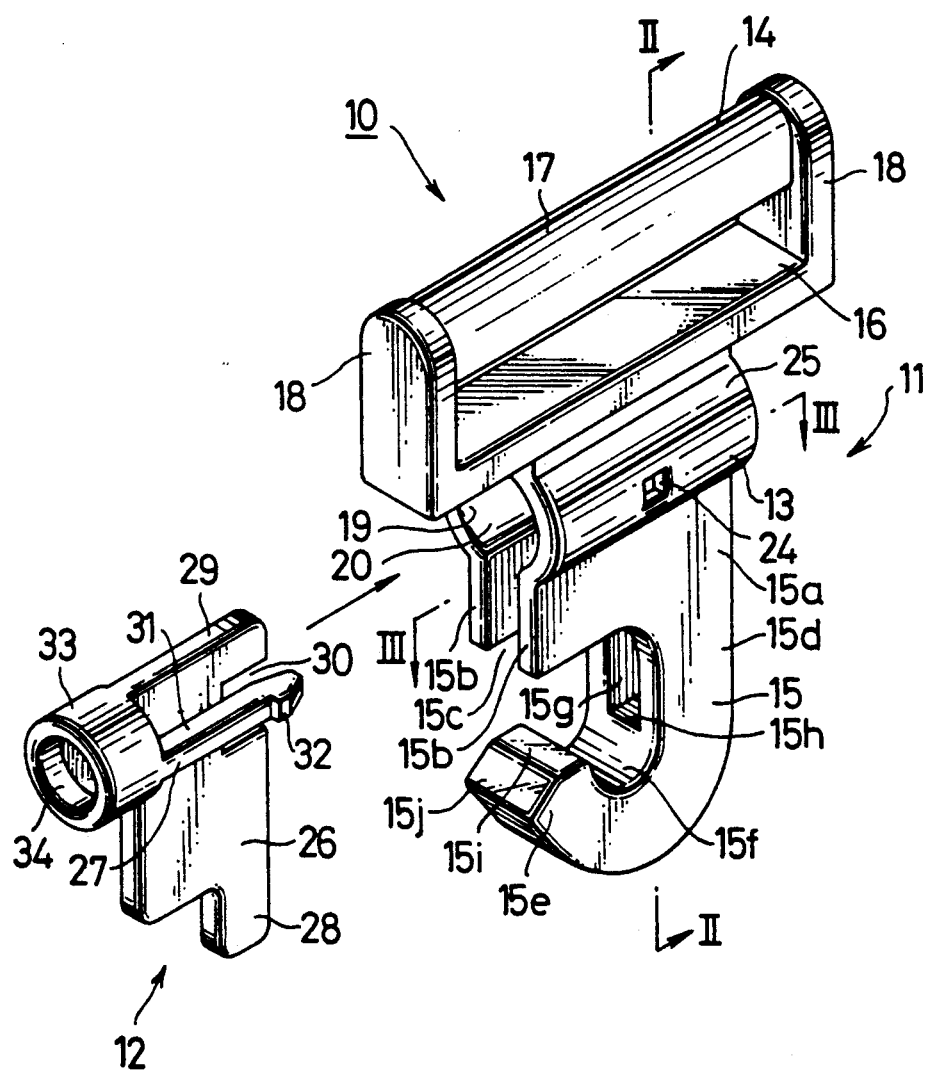
FIG. 1 is an exploded, perspective view of a fastening device embodying the invention.

Referring now to the drawings and FIG. 1 in particular, there is shown a fastening device 10 which comprises a main body 11 and a retainer member 12, both members being formed preferably from a plastics material. The main body 11 includes, integral therewith, a cylindrical socket member 13, a belt connector 14 overlying the socket 13 and a hook member 15 underlying the socket 13.

The belt connector 14 has a flat bar 16 and a connecting bar 17 connected therewith in spaced parallel relation by a pair of flange portions 18, 18 extending upwardly from the flat bar 16. The connecting bar 17 is adapted to wrap thereon a loose end of a belt (not shown) in a manner well known in the art.

Figure 2:
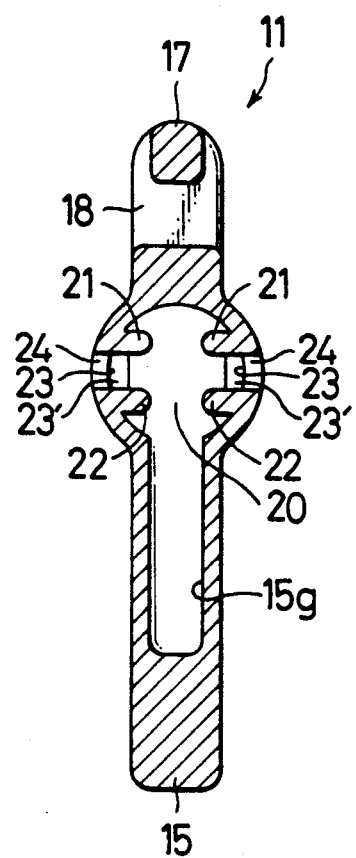
FIG. 2 is a cross-sectional view taken on the line II—II of FIG. 1.

The cylindrical socket 13 has an inner peripheral wall 19 defining a substantially cylindrical opening 20 for releasably receiving the retainer member 12 in a manner hereinafter to be described. A pair of first guide lugs 21, 21 extend radially inwardly from the inner peripheral wall 19 of the socket 13 and have their respective free ends aligned in confronting relation. Underlying the pair of first guide lugs 21, 21 are a pair of second guide lugs 22, 22 extending radially inwardly from the inner cylindrical wall 19 in a manner similar to the first pair of lugs 21, 21. The first and second pairs 21, 21 and 22, 22 are spaced apart in parallel to provide therebetween a pair of guide slots 23, 23 in diammetrically opposed relation in the inner peripheral wall 19 which progressively taper as at 23', 23' towards one end of the cylindrical socket 13 as better shown in FIGS. 2 and 3.

A lock window 24 is formed centrally in each of arcuate side walls 25, 25 of the cylindrical socket 13 in communication with each of the guide slots 23, 23.

Figure 3:
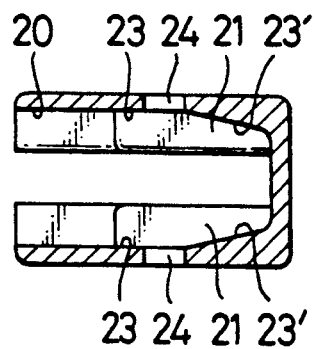
FIG. 3 is a cross-sectional view taken on the line III—III of FIG. 1.

The hook member 15 is a substantially "J"-shaped structure having a web portion 15a coextensive with the socket 13 and bifurcated to provide a pair of shoulders 15b, 15b with the cylindrical opening 20 and terminates beyond the lock window 24 as better shown in FIG. 3.

Figure 6:
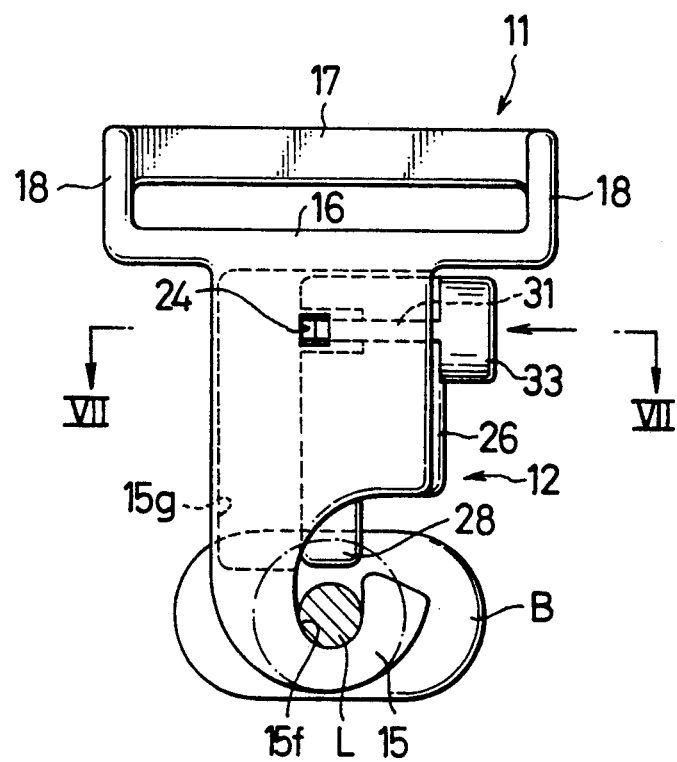
FIG. 6 is a side elevational view of the fastening device of FIG. 1 shown assembled and connected with a link on a garment article such as a bag.

The web portion 15a is recessed to provide a straight vertical portion 15d and a hook portion 15e defining therewith an arcuate bay 15f for anchoring therein a link L of a garment article such as a bag B as shown in FIG. 6. The straight vertical portion 15d has a vertical elongated slot 15g communicating with the aperture 15c and terminating at a bottom end wall 15h.

The hook portion 15e has an end face 15i registering in position with the bottom end wall 15h of the vertical slot 15g and merging with an inclined guide surface 15j.

The retainer member 12 to be assembled with the main body 11 of the fastening device 10 consists of a plate portion 26 and a plug portion 27. The plate portion 26 is partially cut away to provide a downwardly projecting tongue 28 dimensioned to cover the arcuate bay 15f of the hook member 15 and having a thickness slightly smaller than that of the vertical slot 15g of the hook member 13. The plug portion 27 includes a horizontally projecting lug 29 which is a continuation of the plate portion 26 remote from the tongue 27 and provided by a cut-away recess 30.

Figure 4:
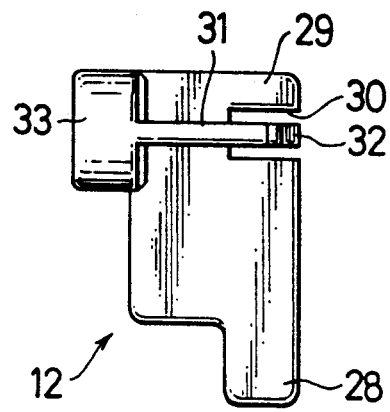
FIG. 4 is a side elevational view of a retainer member operatively associated with and forming one part of the device of FIG. 1.
Figure 5:
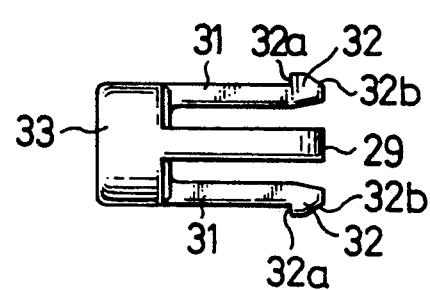
FIG. 5 is a top plan view of the retainer member.

The plug portion 27 further includes a pair of elongate resilient arms 31, 31 extending horizontally in parallel with each other on opposite sides of and in spaced apart relation to the lug 29 and having respective arrow-like heads 32, 32 positioned in the region of the recess 30 and each having an outwardly directed hooking projection 32a and a tapering guide edge 32b as better shown in FIGS. 4 and 5. The retainer member 12 is provided with a circular knob 33 formed integrally at one end of the plug portion 27 and dimensioned to fit with the cylindrical opening 20 of the socket 13. A circular recess 34 is formed in one end of the knob 33 remote from the arrow-like heads 32, 32 for facilitating the manipulation of the retainer member 12 by the user's finger.

Figure 7:
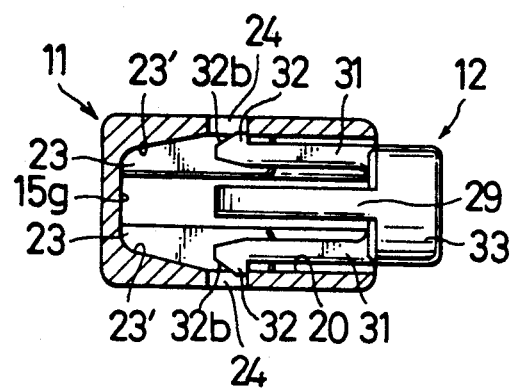
FIG. 7 is a cross-sectional view taken on the line VII—VII of FIG. 6, showing the fastening device in one operative position.

The fastening device 10 thus constructed is assembled by joining the retainer member 12 with the main body 11, in which instance the plug portion 27 is inserted into the cylindrical opening 20 of the socket 13 with the arms 31, 31 registered with the guide slots 23, 23 and the arrow-like heads 32, 32 sliding frictionally in contact with the peripheral walls of the slots 23, 23 in the socket 13, causing the arms 31, 31 to flex inwardly toward each other by elastic deformation until the projections 32a, 32a of the heads 32, 32 are captured by and locked into the lock windows 24, 24, in which position the retainer member 12 is disposed with its tongue portion 28 overlying and closing off the arcuate bay 15f of the hook member 15 as shown in FIG. 7 and indicated by the solid line in FIG. 6.

Figure 8:
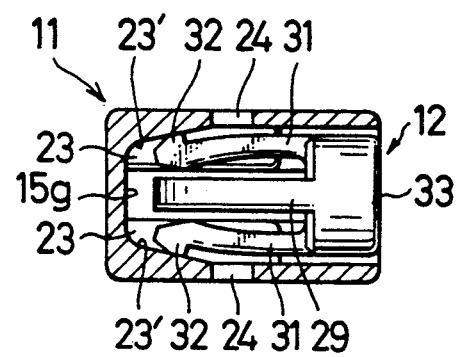
FIG. 8 is a view similar to FIG. 7 but showing the fastening device in another operative position.

When connecting the link L of the bag B to the fastening device 10, this is done by moving the plug portion 27 of the retainer member 12 further inward through the socket 13 until the arrow-like heads 32, 32 are released from the lock windows 24, 25 and urged to converge toward each other in contact with the tapered portions 23′, 23′ of the slots 23, 23 as shown in FIG. 8 and indicated by the phantom line in FIG. 6, in which position the retainer member 12 is disposed with its tongue portion 28 shifted past the bay 15f of the hook member 12 and with its knob 33 fully inserted within the socket 13 so that the bay 15f is open for receiving the link L of the bag B. After thus engagement of the link L with the hook member 12, the finger is released from the knob 33 whereupon the retainer member 12 is urged to retract to the position of FIG. 7 by the resilient action of the arms 31, 31 which causes the arrow-like heads 32, 32 to slide back along the tapered portions 23′, 23′ of the slots 23, 23 until they are snapped into the lock windows 24, 24, in which position the tongue 28 of the retainer member 12 overlies and closes off the opening of the bay 15f of the hook member 15 so that the link L of the bag B is securely anchored in the bay 15f against unintentional disengagement from the fastening device 10.

Figure 9:
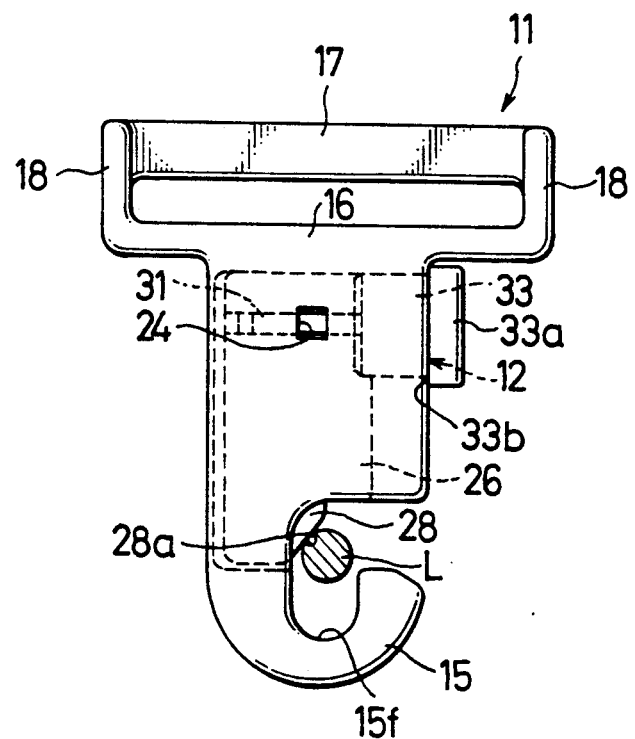
FIG. 9 is a view similar to FIG. 6 but showing a modified form of fastening device according to the invention.

FIG. 9 shows a modified form of fastening device 10 in which the tongue portion 28 of the retainer member 12 has an increased width and is provided with a canted inner corner 28a serving as a guide surface along which the link L of the bag B is guidely slid into the bay 15f. Another feature of the modified device 10 provides an auxiliary knob 33a formed integrally with but larger in diameter than the knob 33, the auxiliary knob 33a having a peripheral abutment 33b for bearing against the peripheral end wall of the socket 13 thereby limiting the inward movement of the retainer member 12 relative to the socket 13.

Obviously, various modifications and variations of the present invention are possible in the light of the above teaching. It is therefore to be understood that within the scope of the appended claims the invention may be practiced otherwise than as specifically described.

What is claimed is:

1. A fastening device which comprises a main body and a retainer member engageable therewith, said main body including, integral therewith, a cylindrical socket member, a belt connector overlying said socket member and a hook member underlying said socket member, and said retainer member including, integral therewith, a plate portion and a plug portion; said socket member being provided in its inner peripheral wall with a pair of guide slots disposed in diammetrically opposed relation to each other and tapering towards one end of said socket member and further with lock windows communicating with said guide slots; said hook member generally in the form of a "J"-like configuration having an arcuate bay; said plate portion having a downwardly projecting tongue dimensioned to cover said bay; and said plug member being movable in and relative to said socket member and provided with a pair of spaced parallel resilient arms each having arrow-like heads respectively engageable with said guide slots and lockable in said lock windows.

2. A fastening device according to claim 1 wherein said plug member is provided at one end with a circular knob dimensioned to fit with said socket member.

3. A fastening device according to claim 2 wherein said plug member is provided with an auxiliary knob formed integrally with but larger in diameter than said knob.

4. A fastening device according to claim 1 wherein said arms are allowed to flex inwardly with said heads converging toward each other in contact with said guide slots past said lock windows.

* * * * *